United States Patent
Li et al.

(10) Patent No.: US 12,238,597 B2
(45) Date of Patent: Feb. 25, 2025

(54) METHOD, DEVICE, COMMUNICATION DEVICE AND STORAGE MEDIUM FOR CELL HANDOVER

(71) Applicant: BEIJING XIAOMI MOBILE SOFTWARE CO., LTD., Beijing (CN)

(72) Inventors: He Li, Beijing (CN); Yang Yang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 610 days.

(21) Appl. No.: 17/512,545

(22) Filed: Oct. 27, 2021

(65) Prior Publication Data

US 2022/0330124 A1 Oct. 13, 2022

(30) Foreign Application Priority Data

Apr. 9, 2021 (CN) .......................... 202110385107.2

(51) Int. Cl.
*H04W 36/08* (2009.01)
*H04W 36/24* (2009.01)
*H04W 36/30* (2009.01)

(52) U.S. Cl.
CPC ......... *H04W 36/08* (2013.01); *H04W 36/249* (2023.05); *H04W 36/302* (2023.05); *H04W 36/304* (2023.05)

(58) Field of Classification Search
CPC . H04W 36/0085; H04W 36/08; H04W 36/30; H04W 36/24; H04W 88/02; H04W 36/083; H04W 36/085; H04W 36/087; H04W 36/13; H04W 36/247; H04W 36/249; H04W 36/302; H04W 36/304
See application file for complete search history.

(56) References Cited

U.S. PATENT DOCUMENTS

| | | | |
|---|---|---|---|
| 7,260,399 B1 | 8/2007 | Oh et al. | |
| 10,172,049 B2 | 1/2019 | Lindoff et al. | |
| 2007/0047493 A1* | 3/2007 | Park | H04W 74/006 455/436 |
| 2010/0099377 A1 | 4/2010 | Jeong | |

(Continued)

FOREIGN PATENT DOCUMENTS

| | | |
|---|---|---|
| CN | 102325353 A | 1/2012 |
| CN | 103369596 A | 10/2013 |

(Continued)

OTHER PUBLICATIONS

Network Congestion Control (2) Overview of Congestion, https://www.cnblogs.com/fll/archive/2008/06/02/1212487.html, (7p).

(Continued)

*Primary Examiner* — Ji-Hae Yea
(74) *Attorney, Agent, or Firm* — Arch & Lake LLP

(57) ABSTRACT

The present disclosure relates to a method, device, communication device and storage medium for cell handover. The cell handover method is applied to a user equipment UE. The method includes: monitoring a transmission delay of a first cell where the UE is currently located; and reporting a preset message in response to the transmission delay reaching a delay threshold. The preset message is configured to trigger a base station to issue a cell handover command instructing the UE to perform cell handover.

18 Claims, 7 Drawing Sheets

(56) References Cited

U.S. PATENT DOCUMENTS

| | | | |
|---|---|---|---|
| 2012/0294142 A1 | 11/2012 | Kneckt et al. | |
| 2014/0357275 A1* | 12/2014 | Quan | H04W 36/0061 455/436 |
| 2015/0141021 A1 | 5/2015 | Kapoulas et al. | |
| 2017/0215117 A1* | 7/2017 | Kwon | H04B 7/0408 |
| 2022/0095176 A1* | 3/2022 | Lim | H04W 36/0058 |
| 2023/0141032 A1* | 5/2023 | Awad | H04W 56/0015 370/350 |

FOREIGN PATENT DOCUMENTS

| | | | | |
|---|---|---|---|---|
| CN | 107333293 A | | 11/2017 | |
| CN | 109245936 A | | 1/2019 | |
| CN | 110868746 A | | 3/2020 | |
| CN | 111294881 A | | 6/2020 | |
| CN | 112333734 A | | 2/2021 | |
| WO | WO-2015116870 A1 | * | 8/2015 | ........ H04W 36/0055 |
| WO | WO2016/207688 A1 | | 12/2016 | |
| WO | 2021051286 A1 | | 3/2021 | |

OTHER PUBLICATIONS

Optimization Methods for Common Cell Congestion, Release Date Aug. 8, 2018, https://wenku.baidu.com/view/69422413bf23482fb4daa58da0116c175f0e1eb5.html, (28p).

Handling of Voice Congestion in the 4G Era, Shi Lizhi, Release Date 2017, China Communications (No. 18, Issue in 2017), (3p).

Extended European Search Report issued in EP Application No. 21208493.3, dated May 12, 2022,(10p).

CMCC, "Discussion on feeder link switch for NTN" 3GPP TSG-RAN WG3#111-e, R3-210912, e-Meeting, Jan. 25-Feb. 4, 2021, (6p).

The First Chinese Office Action issued in CN Application No. 202110385107.2 dated May 12, 2023 with English translation, (14p).

The Second Chinese Office Action issued in CN Application No. 202110385107.2 dated Sep. 18, 2023 with English translation, (17p).

The First European Office Action issued in EP Application No. 21208493.3 dated May 14, 2024, (7p).

* cited by examiner

METHOD, DEVICE, COMMUNICATION DEVICE AND STORAGE MEDIUM FOR CELL HANDOVER

CROSS-REFERENCE TO RELATED APPLICATION

The present application is based on and claims the priority of Chinese patent application number 202110385107.2 filed Apr. 9, 2021, the entire content of which is hereby incorporated by reference into the present application for all purposes.

TECHNICAL FIELD

The present disclosure relates to the field of communication technology, and in particular to a method, device, communication device, and storage medium for cell handover.

BACKGROUND

When congestion occurs on the side of user equipment (UE), the user state data of the user equipment cannot be transmitted, and the UE executes services accordingly. Exemplarily, the UE cannot display videos, or the UE cannot send out messages. In this case, if the UE continues to stay in the currently serving cell, this congestion phenomenon of the UE will continue for a relatively long period of time or occur frequently, leading to problems such as poor communication quality of the UE and poor user experience.

SUMMARY

The present disclosure provides a method, device, communication device, and storage medium for cell handover.

A first aspect of the present disclosure provides a cell handover method, which is applied to a user equipment UE. The method includes: monitoring a transmission delay of a first cell where the UE is currently located; and reporting a preset message in response to the transmission delay reaching a delay threshold. The preset message is configured to trigger a base station to issue a cell handover command instructing the UE to perform cell handover.

A second aspect of the present disclosure provides a UE cell handover method, which is applied to a base station of a first cell. The method includes: receiving a preset message sent by the UE when a transmission delay of the first cell is monitored to reach a delay threshold; and issuing a cell handover command instructing the UE to perform cell handover according to the preset message.

According to a third aspect of the present disclosure, a communication device is provided, including: a memory for storing processor executable instructions; and a processor connected to the memory, wherein the processor is configured to execute the cell handover method as described in the first aspect of the present disclosure.

BRIEF DESCRIPTION OF THE DRAWINGS

The drawings herein are incorporated into the present specification and constitute a part of the present specification, show examples in accordance with the present disclosure, and are used together with the present specification to explain the principle of the present disclosure.

DETAILED DESCRIPTION

Figure 1:
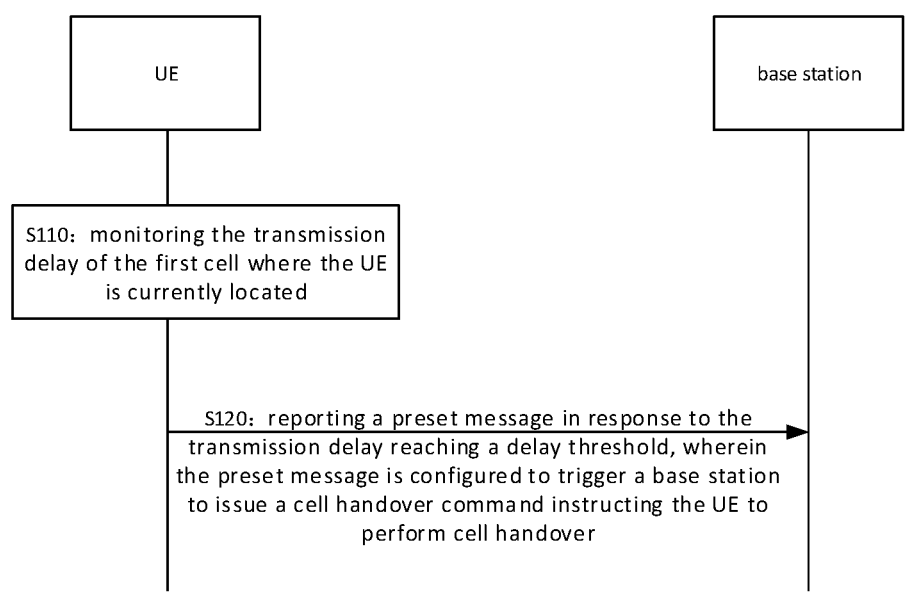
FIG. 1 is a schematic flowchart of a cell handover method according to one or more examples of the present disclosure.

The exemplary embodiments will be described in detail here, and examples thereof are shown in the accompanying drawings. When the following description refers to the drawings, unless otherwise indicated, the same numbers in different drawings indicate the same or similar elements. The implementations described in the following exemplary embodiments do not represent all implementations consistent with the present disclosure. On the contrary, they are merely examples of devices consistent with some aspects of the present disclosure as detailed in the appended claims.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

As shown in FIG. 1, an example of the present disclosure provides a cell handover method, which is applied to a UE. The method includes: S110: monitoring the transmission delay of the first cell where the UE is currently located; and S120: reporting a preset message in response to the transmission delay reaching a delay threshold, wherein the preset message is configured to trigger a base station to issue a cell handover command instructing the UE to perform cell handover.

The method can be applied to various UEs. The UEs can include mobile phones, tablets, wearable devices, vehicle-mounted devices, or machines that can move on their own. These machines that can move on their own include, but are not limited to, ground robots and/or low-flying aircraft.

In an example, the transmission delay includes at least one of the following: the transmission delay of a downlink transmission of the UE; the transmission delay of an uplink transmission of the UE; and the average delay of the uplink and downlink transmissions of the UE.

The UE monitors the transmission delay of the first cell where the UE is currently located, and can determine the transmission delay of the first cell where the UE is currently located according to the round-trip time of data packet transmission between the UE and the base station of the first cell. Exemplarily, the UE sends a request message, and the UE receives a response message of the request message from base station. Based on the time difference between the sending time point of the request message and the receiving time point of the response message, the transmission delay can be directly determined.

In another example, the UE monitors the response message after sending the request message. If the response data packet is not received at the intended time to receive the response message, it can be considered that the UE has monitored the transmission delay, at least until the time difference between the intended time and the sending time point of the request message.

In short, there are many ways to monitor the transmission delay of the first cell where the UE is currently located, and they are not limited to the above examples.

The first cell where the UE is currently located may include at least the serving cell of the UE or the last serving cell of the UE.

The delay threshold may be configured by the base station, or configured by the UE itself. Alternatively, the delay threshold may be a time duration value negotiated by the base station and the UE or determined according to a communication standard.

In some examples, the delay threshold includes: a first type of threshold which is a threshold that characterizes the congestion of the UE; or a second type of threshold which represents a threshold at which the UE is about to be congested. The time duration value corresponding to the second type of threshold is less than the time duration value of the first type of threshold.

Exemplarily, if the UE currently detects that the transmission delay reaches the second type of threshold and determines that the transmission delay has an increasing trend, it is determined that the UE is about to be congested.

In an example of the present disclosure, if the UE detects that its own transmission delay reaches the delay threshold, it reports a preset message.

The preset message will trigger the base station on the network side to determine whether it is necessary to instruct the UE to perform cell handover. If the UE performs cell handover, the UE can switch to a cell with no transmission congestion or a less congested cell, and the new cell after cell handover provides communication service to the UE. This can improve communication quality and user experience.

In some examples, the step S120 may include: monitoring the transmission delay of neighboring cells of the first cell in response to the transmission delay of the first cell reaching the delay threshold; and in response that the neighboring cells of the first cell comprise at least one second cell whose transmission delay is less than the transmission delay of the first cell, reporting the preset message carrying a cell identifier of the second cell, wherein the preset message is configured to trigger the network side to issue the cell handover command based on the cell identifier of the second cell.

The UE will detect the neighboring cells of the current first cell and determine that the transmission delay of a neighboring cell is less than the transmission delay of the first cell where it is currently located. This means that the UE will get higher communication quality when located in the corresponding neighboring cell.

The UE can monitor the transmission delays of the neighboring cells of the first cell based on the results of multiple measurements. The average delay of the multiple measurements can be used to determine whether there is a neighboring cell with a smaller transmission delay than the first cell. Exemplarily, the UE monitors the transmission delays of the neighboring cells of the first cell. When the UE detects that several transmission delays of a certain neighboring cell is less than the transmission delay of the first cell, it is considered that there is a neighboring cell of the first cell whose transmission delay is less than the transmission delay of the first cell itself. Alternatively, the UE monitors the transmission delays of the neighboring cells of the first cell. When the UE detects that the average transmission delay of a certain neighboring cell is less than the transmission delay of the first cell, it is considered that there is neighboring cell of the first cell whose transmission delay is less than the transmission delay of the first cell itself.

In an example of the present disclosure, the preset message is reported only when it is monitored that the transmission delay of at least one neighboring cell is less than the transmission delay of the first cell. If the transmission delay of a neighboring cell is less than the transmission delay of the first cell, it means that the UE has a target cell for cell handover. At this time, it is necessary to report the preset message, thereby reducing the unnecessary reporting of an unnecessary preset message and an unnecessary cell handover.

In an example of the present disclosure, if the transmission delay of at least one neighboring cell is less than the transmission delay of the first cell, the preset message will also carry the cell identifier of the second cell when the preset message is reported. This is equivalent to the UE telling the base station that the target cell for which the UE requests cell handover is the second cell whose current transmission delay is less than the transmission delay of the first cell.

The cell identifier of the second cell is carried in the preset message, so that the network can easily know the target cell to which the UE needs to be handed over according to the preset message. In this way, the first cell can interact with the second cell to exchange the cell handover configurations required by the UE for cell handover, etc., according to the cell identifier of the second cell.

Exemplarily, the report of the preset message carrying the cell identifier of the second cell includes: sending an A3 event message carrying the cell identifier of the second cell; or sending a cell handover request message carrying the cell identifier of the second cell.

The preset message may be an A3 event message carrying the cell identifier of the second cell. Generally, if the UE is located at an edge of the cell, the UE monitors the signal value of the reference signal in the cell and a neighboring cell. If the signal value of the neighboring cell is stronger than the signal value of the cell, the UE can report the A3 event message. Then, the network side will consider switching the UE to the neighboring cell with a stronger signal value.

The base station on the network side receives the A3 event message, and considers that the UE is currently located at the edge of cell and the message is reported due to the A3 event detecting a neighboring cell with a stronger signal value, thereby triggering the UE to perform cell handover.

If the preset message is an A3 event message, the message format of the A3 event is used to report the A3 event, but actually the UE may not detect the A3 event currently.

In another example, the UE may directly report the cell handover request message, and the cell handover request message may also directly carry the cell identifier of the second cell. In this way, when the base station receives the cell handover request message, it will start the cell handover procedure of the UE.

In an example, the method further includes: in response that the neighboring cells of the first cell do not comprise at least one neighboring cell whose transmission delay is less than the transmission delay of the first cell, not reporting the preset message.

There are multiple neighboring cells of the first cell. If the UE monitors the transmission delays of the neighboring cells and finds that the transmission delays of multiple neighboring cells are less than the transmission delay of the first cell, for the purpose of ensuring the transmission rate after cell handover of the UE is as high as possible, the neighboring cell having the smallest transmission delay less than the transmission delay of the first cell is determined as the second cell, and the cell identifier of the second cell is carried in the A3 event message or the cell handover request message for reporting.

In another example, if there are multiple neighboring cells whose transmission delays are less than the transmission delay of the first cell, each neighboring cell whose transmission delay is less than the transmission delay of the first cell is confirmed as the second cell. In this case, the preset message may carry the cell identifiers of the multiple second cells at the same time. At this time, the base station on the network side can select a neighboring cell with the lowest load rate from the multiple second cells as the target cell for the UE to perform cell handover.

In some examples, the method further includes: detecting the reference signal of a neighboring cell of the first cell to obtain the signal quality value of the reference signal. The signal quality value includes, but is not limited to, Reference Signal Received Power (RSRP), Reference Signal Received Quality (RSRQ), or Signal to Noise Ratio (SNR).

The second cell may be a neighboring cell whose signal quality value reaches a quality threshold. In this way, the transmission delay and the signal quality after the UE is switched to the second cell are considered at the same time, so as to reduce the high error rate or the low SNR after cell handover caused by the UE performing cell handover based only on the transmission delay.

Here, the quality threshold used to determine the second cell may be slightly lower than the reporting threshold of the B1 event and/or the threshold of the A3 event.

In another example, the step S120 may include: reporting the preset message carrying congestion information in response to the transmission delay reaching the delay threshold, wherein the congestion information is used for the network side to determine whether to instruct the UE to perform cell handover.

If the UE finds that the transmission delay of the first cell reaches the delay threshold, it sends the preset message carrying congestion information to the network side.

The congestion information here includes at least one of the following: an indicator that indicates congestion; and the delay value indicating the transmission delay of the first cell.

After the network side receives the congestion information, it will comprehensively determine whether the corresponding UE needs to be switched to a neighboring cell.

In some examples, in addition to carrying the congestion information, the preset message may also carry location information of the UE, so that the base station on the network side can determine the target cell for the UE to perform cell handover according to the preset message.

For example, the preset message carries the location information of the UE, and the network side will determine one or more neighboring cells closest to the UE as the target cell for the UE to perform cell handover according to the cell distribution positions of the neighboring cells.

In other examples, in addition to the congestion information, the preset message may also carry the cell identifier of the neighboring cell detected by the UE. At this time, the cell identifier of the neighboring cell can also be used by the network side to determine the target cell for the UE to perform cell handover.

Of course, in some examples, the network will record the UE's movement track or the UE's location information. In this way, the preset message may not carry the UE's location information and/or the cell identifier of the neighboring cell, and the network side can also determine that the target cell for the UE to perform the cell handover.

If the network side determines to instruct the UE to perform cell handover, the UE will receive the cell handover command issued by the base station at the network side. In this way, the UE can perform cell handover according to the cell handover command.

If the network determines that the UE is not instructed to perform cell handover, the UE may receive a cell handover rejection message, or may not receive any message indicating whether to perform cell handover. Exemplarily, if any message indicating whether to perform cell handover is not received here, it may mean that the UE does not receive at least the cell handover command instructing the UE to perform cell handover.

Figure 2:
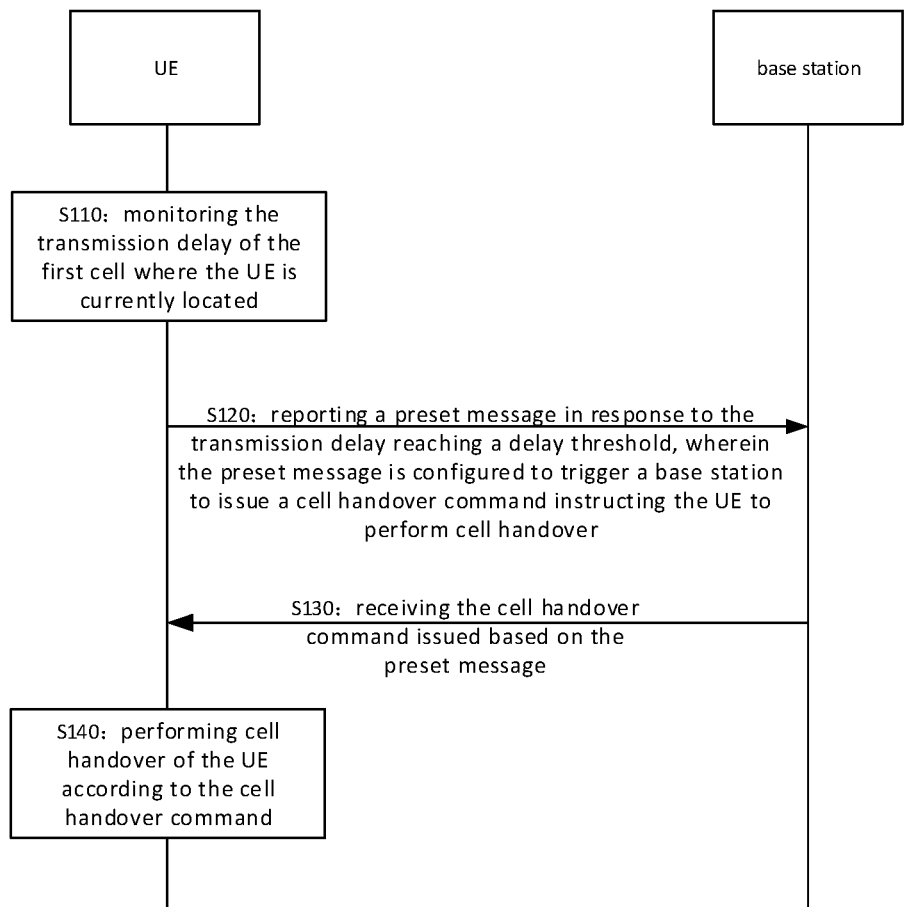
FIG. 2 is a schematic flowchart of a cell handover method according to one or more examples of the present disclosure.

Therefore, in summary, as shown in FIG. 2, the method further includes: S130: receiving the cell handover command issued based on the preset message; and S140: performing cell handover of the UE according to the cell handover command.

If the network side issues the cell handover command, the UE will perform cell handover, so that the cell where the UE is located is switched to a neighboring cell of the first cell.

In this way, the UE will perform cell handover in time when it detects transmission congestion with a relatively large transmission delay, so as to switch to a cell with no transmission congestion or less congestion, thereby increasing the transmission rate of the UE and ensuring the smooth service of the UE. Thus, the UE's communication quality and user experience will be improved.

In some examples, the method further includes: determining the current service of the UE. The step S120 may include: in response that the transmission delay reaches the delay threshold and the current service of the UE is a preset service, reporting the preset message.

There are multiple services that UE can provide. Some services have low tolerance of transmission delay, and some have high transmission delay. For services with low tolerance of transmission delay, they are highly sensitive to transmission delay. Absence of emission or receipt of the corresponding transmission will cause the service provision to be interrupted.

In an example of the present disclosure, the preset service is a service with low tolerance of transmission delay.

In some examples, the preset service may be a service with low tolerance of transmission delay, such as a high-reliable and low-latency communication (URLLC) service. Exemplarily, the preset service may include an online game service, a web live broadcast service, or a video broadcast service, etc.

In some examples, the current service being a preset service includes at least one of the following: the application of the current service being in a preset application list; and the current service being a service that is determined according to historical records to have the UE ever triggered to perform cell handover when the transmission delay reaches the delay threshold.

The preset application list may include one or more application identifiers with low tolerance for service data transmission. The application type indicated by the application identifier may include, but is not limited to, game application, video website application, short video application, or live broadcast application, etc.

In some examples, the UE may provide a human-computer interaction portal, a user operation may be detected based on such portal, and the preset service may be required according to the setting of the user operation. In this way, the application identifiers included in the preset application list may be determined according to the user operation. Alternatively, it may be determined according to the application type of the application or the data type of the service data provided by the application.

In some examples, the UE also has an interactive interface for instructing handover. If the user finds that the transmission delay is too large at a certain point in time and triggers cell handover, then the service performed by the UE at this time will be recorded as a preset service. This service is a service which has ever triggered the UE to change the cell where it is located because of the long transmission delay (that is, a service that has the UE ever triggered to perform cell handover).

In some examples, the historically recorded service that triggered the UE to perform cell handover when the transmission delay reaches the delay threshold may also be a service determined based on subscription information.

In summary, in an example of the present disclosure, there are many ways to determine whether the current service is a preset service, and they are not limited to any one of the foregoing examples.

In some examples, if the current service of the UE is not the preset service, the preset message will not be reported because the transmission delay of the first cell reaches the delay threshold.

In some examples, the method further includes: saving the on-site information of the current service by the UE when the UE reports the preset message, wherein the saved on-site information is used to continue running the current service after the UE performs cell handover.

The scene information here may be: scene information of the thread used when the UE executes the current service; and/or scene information of the stack used when the UE executes the current service, etc.

Exemplarily, the on-site information of the thread may include various information stored in the processor on-site while the thread is running. Any thread must save the current information in the processor on-site into the thread control section when it gives up the processor. When the thread resumes operation, the processor on-site should also be restored. Common on-site information includes contents of general-purpose registers, contents of control registers (such as Program Status Word (PSWE) registers), user stacking pointers, system dumping pointers, etc.

Through the preservation of on-site information, the loss of on-site information of the current service of the UE during the cell handover process can be reduced, which would otherwise degrade the quality of service provision after the subsequent handover to the target cell, etc.

Figure 3:
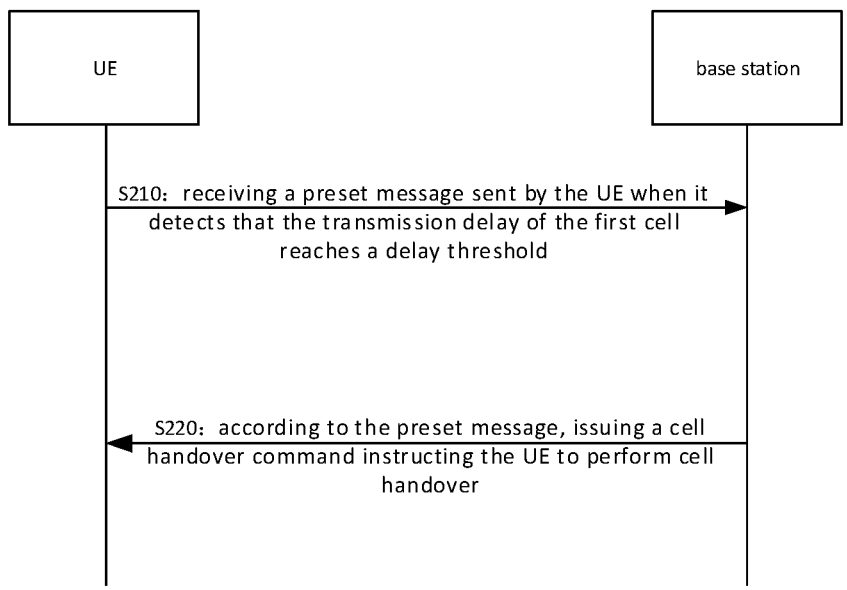
FIG. 3 is a schematic flowchart of a cell handover method according to one or more examples of the present disclosure.

As shown in FIG. 3, an example of the present disclosure provides a UE cell handover method, which is applied to a base station of a first cell. The method includes: S210: receiving a preset message sent by the UE when it detects that the transmission delay of the first cell reaches a delay threshold; and S220: according to the preset message, issuing a cell handover command instructing the UE to perform cell handover.

The cell handover method provided in examples of the present disclosure is applied to the base station of the first cell, and the base station may be an evolved base station (eNB) or a fifth generation mobile communication (5th Generation, 5G) base station.

In an example, the base station receives the preset message sent by the UE when it detects that the transmission delay of the first cell reaches the delay threshold, and determines whether to instruct the UE to perform cell handover. If the base station determines to instruct the UE to perform cell handover, it will directly issue the cell handover command.

In another example, the base station receives the preset message sent by the UE when it detects that the transmission delay of the first cell reaches the delay threshold, and directly triggers the UE to perform cell handover.

In an example of the present disclosure, the UE will send the preset message when it detects that the transmission delay of the first cell reaches the delay threshold, and may also issue the cell handover command that triggers the UE to perform cell handover, so that the UE can do its best to switch to other cells. This can relieve the current congestion of the first cell on the one hand. On the other hand, this can also enable the UE that is handed over to obtain a higher transmission rate, resulting in better communication quality and better user experience.

In some examples, the preset message is: an A3 event message carrying the cell identifier of a second cell; or a cell handover request message carrying the cell identifier of a second cell, wherein the second cell is a neighboring cell of the first cell.

The second cell may be a target cell where the cell handover command instructs the UE to perform cell handover.

If the preset message reported by the UE is an A3 event message or a cell handover request message, which carries the cell identifier of the second cell, the base station on the network side does not need to determine the target cell for the UE to perform cell handover, thereby simplifying the operation on the network side.

The second cell here is a cell whose transmission delay is lower than the transmission delay of the first cell.

In some examples, the second cell may be a neighboring cell having a transmission delay less than the transmission delay of the first cell and having the smallest transmission delay among the neighboring cells of the first cell.

In some examples, the step S220 may include: issuing the cell handover command instructing the UE to switch to the second cell according to the preset message.

If the preset message carries the cell identifier of the second cell, the cell handover command directly instructs the UE to switch to the second cell. After receiving the cell handover command, the UE will switch from the first cell to the second cell.

In some examples, the preset message is the preset message carrying congestion information.

Figure 4:
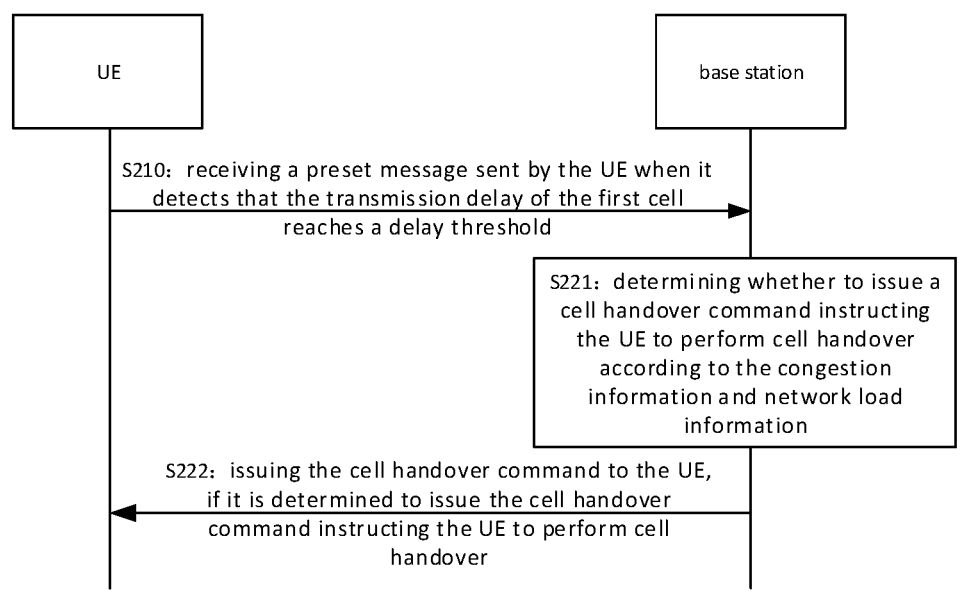
FIG. 4 is a schematic flowchart of a cell handover method according to one or more examples of the present disclosure.

As shown in FIG. 4, the step S220 may include: S221: determining whether to issue a cell handover command instructing the UE to perform cell handover according to the congestion information and network load information; and S222: issuing the cell handover command to the UE, if it is determined to issue the cell handover command instructing the UE to perform cell handover.

In an example, the congestion information at least indicates that the transmission of the UE is congested or that the transmission delay of the UE in the first cell reaches the delay threshold.

In another example, the congestion information may also carry the transmission delay in the first cell monitored by the UE.

In short, in an example of the present disclosure, the base station of the first cell will determine whether to allow the UE to perform cell handover based on the congestion information and current network load information. If the UE is allowed to perform cell handover, it will issue a cell handover command. If the UE is forbidden to perform cell handover, no cell handover command will be issued. If the UE does not receive the cell handover command issued based on the preset message within a preset time period, the UE may stop monitoring the cell handover command issued by the base station.

In some examples, the base station may also prohibit the UE from performing cell handover due to congestion indicated by the congestion information, and may also send a rejection message. The rejection message clearly instructs the UE to prohibit cell handover due to the current congestion indicated by the congestion information. Thus, a phenomenon is avoided where the UE continuously monitors for a time period equal to the preset duration, thereby reducing the power consumption caused by the UE monitoring the cell handover command.

In some examples, the network load information includes at least one of the following: load status information of the currently serving cell of the UE; and load status information of a neighboring cell of the serving cell.

In some examples, the determining whether to issue the cell handover command instructing the UE to perform cell handover according to the congestion information and the network load information includes at least one of the following: determining, according to the congestion information and the load status information of the first cell, to issue the cell handover command instructing the UE to perform cell handover when it is determined that the load rate of the serving cell reaches a first threshold; determining, according to the congestion information and the load status information of the neighboring cell, to issue the cell handover command instructing the UE to perform cell handover when it is determined that the load rate of the neighboring cell is lower than a second threshold; and determining, according to the congestion information, the load status information of the first cell, and the load status information of the neighboring cell, to issue the cell handover command instructing the UE to perform cell handover when it is determined that the load balance condition for transferring loads to the neighboring cell is satisfied.

If the current load rate of the first cell is very high, it means that the first cell has access to too many UEs or the concurrency of UEs in the first cell is high. At this time, in order to ensure the communication quality of the UEs in the entire cell, some UEs are switched to a neighboring cell. In this way, not only the communication quality of these UEs is improved, but also the communication quality of the UE that has not been transferred out from the first cell is improved.

The first threshold is a load rate threshold, and the first threshold may be an empirical value or a simulation value such as 0.7, 0.8, or 0.75.

In some examples, the method further includes: sending a message confirmation instruction to the UE after receiving the preset message.

In some scenarios, through the issuance of the message confirmation instruction, the UE knows that the preset message carrying the congestion information has been sent successfully, and the UE may not need to repeat sending to ensure the successful reception by the base station.

In other scenarios, with the issuance of the message confirmation indication, if the UE does not receive the cell handover command within a certain period of time after the message confirmation indication is received, the UE can know that it is not because the preset message was not successfully sent and the cell handover command was not received, but is more likely because that the base station refuses the UE to perform handover due to current congestion, or because that the neighboring cell that the UE intends to switch into rejects the UE's access.

When a congestion scenario occurs on the terminal side, the user state data cannot obtain valid data, which causes the terminal service to freeze, and greatly reduces the user experience.

Exemplarily, the congestion on the terminal side here includes: the screen of the terminal is stuck; or the amount of data transmission is small or even no data transmission, etc.

A First Exemplary Implementation

The terminal is currently located on cell A, and the transmission delay is obtained. When it detected that the transmission delay is equal to or higher than a certain threshold, the terminal constructs a pseudo A3 event, and it is recommended perform network handover to another cell B.

When the terminal is in cell B, it obtains the transmission delay, performs weight calculation on the last 5 transmission delays, and retains the cell identifier (ID) and transmission delay of the optimal neighboring cell. The optimal neighboring cell here may be: the neighboring cell with the smallest transmission delay, or the neighboring cell with the optimal combination of the transmission delay and the signal value of the reference signal.

The terminal dynamically obtains the transmission delay. If the current cell B has a delay greater than the transmission threshold, the best historical cell is selected and other cells or the current cell is chosen for stay through detection or Pseudo A3.

The steps performed by the UE may be specifically as follows.

The UE is located in a cell and obtains the transmission delay of the cell.

The UE determines whether the current transmission delay is greater than the delay threshold.

According to the current business and historical records, the UE determines whether to construct a pseudo A3 event to suggest that the network performs cell handover of the UE.

The UE notifies the occurrence of an AP side event and updates the business information status.

The UE is located in cell B and determines the transmission delay of cell B.

After weight calculation, the historical record is updated. If an A3 event message is currently sent based on the pseudo A3 event, the history record will be updated according to the current service and/or whether the base station has instructed cell handover.

A Second Exemplary Implementation

If the transmission delay of the cell where it is currently located is greater than the delay threshold, the network protocol is extended and additional signaling information (or Additional Information) is added, which is used to notify congestion of the current terminal service. Such additional information may be one of the aforementioned congestion information.

After the network obtains the congestion information, it will determine information such as load balance, capacity, and downlink delay, and then comprehensively determines whether the UE needs to perform cell handover.

The network notifies the terminal to receive congestion information. For example, the network side issues indication (Ind) or confirmation (CNF).

The handover command (Cmd) is issued.

The terminal completes cell handover.

The terminal congestion is resolved.

Figure 5:
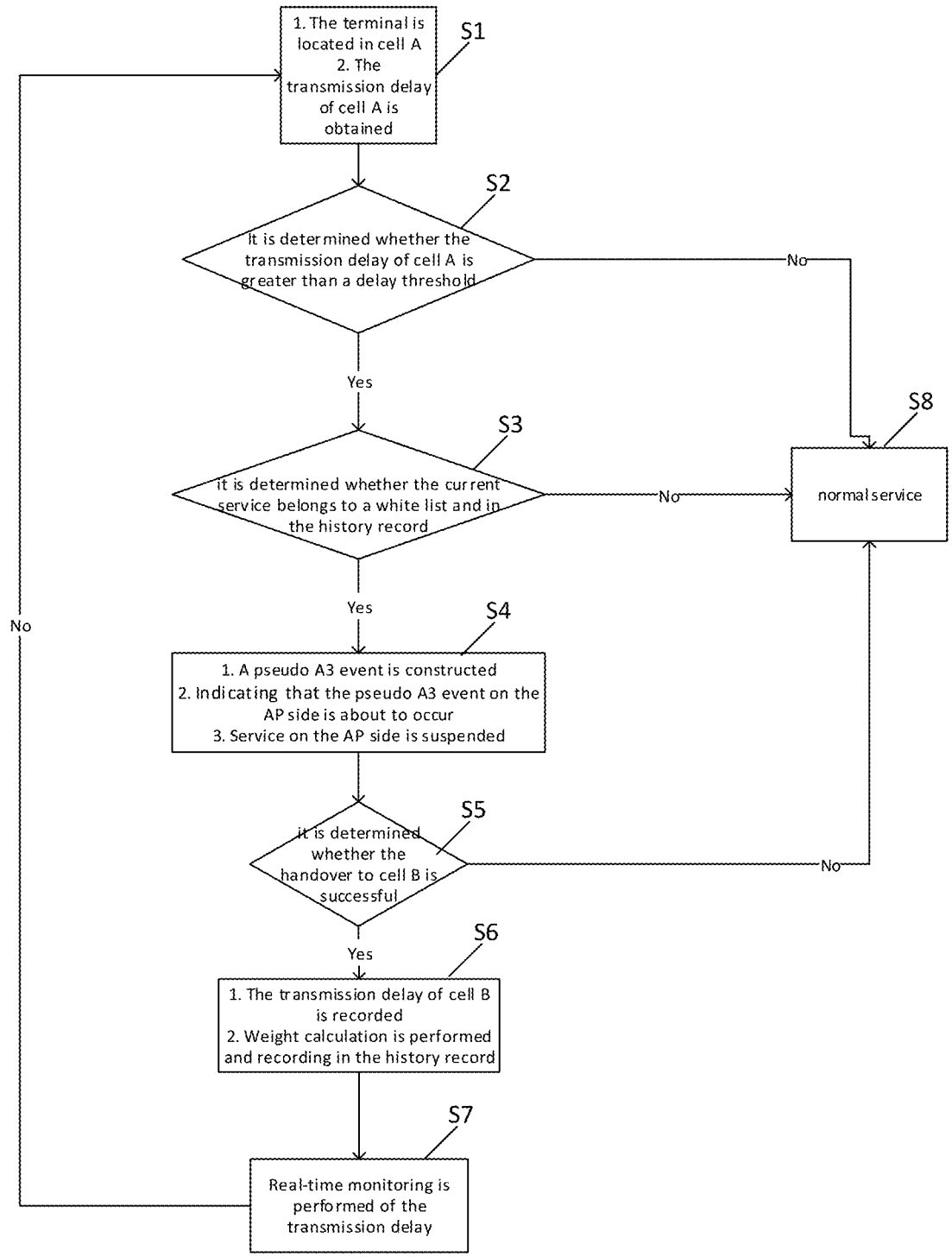
FIG. 5 is a schematic flowchart of a cell handover method according to one or more examples of the present disclosure.

As shown in FIG. 5, an example of the present disclosure provides a cell handover method, including the following steps.

In S1, the terminal is located in cell A, and the transmission delay of cell A is obtained.

In S2, it is determined whether the transmission delay of cell A is greater than the delay threshold.

In S3, if yes, it is determined whether the current service belongs to a service list and whether the current service is in the history record where cell handover of the UE is triggered by the transmission delay.

In S4, if yes, a pseudo A3 event is constructed, indicating that the pseudo A3 event on the AP side is about to occur and the current service is suspended. The suspension of the current service here can be suspending the execution of the current service. Further, while suspending the current service, the on-site information is still kept when the current business is suspended.

In S8, if not, the UE continues to perform services normally.

In S5, it is determined whether the handover to cell B is successful.

In S6, if yes, the transmission delay of cell B is recorded, weight calculation is performed on multiple transmission delays, and the transmission delay of cell B is recorded in the history record.

In S7, real-time monitoring is performed of the transmission delay of the cell where the UE is currently located.

Figure 6:
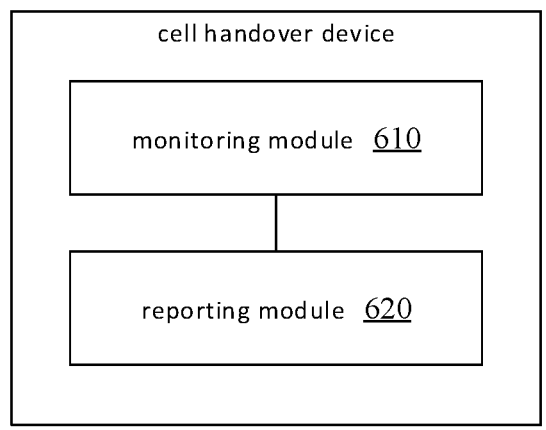
FIG. 6 is a schematic structural diagram of a cell handover device according to one or more examples of the present disclosure.

As shown in FIG. 6, an example of the present disclosure provides a cell handover device, which is applied to a user equipment UE. The device includes: a monitoring module 610, configured to monitor the transmission delay of the first cell where the UE is currently located; and a reporting module 620, configured to report a preset message in response to the transmission delay reaching a delay threshold, wherein the preset message is used to trigger a base station to issue a cell handover command instructing the UE to perform cell handover.

In some examples, the monitoring module 610 and the reporting module 620 are both program modules. After the program modules are executed by a processor, the determination of the transmission delay of the first cell and the reporting of the preset messages can be realized.

In other examples, the monitoring module 610 and the reporting module 620 may both be modules combining both software and hardware. The modules combining both software and hardware may include various programmable arrays. The programmable arrays include, but are not limited to, complex programmable array and/or field programmable array.

In some other examples, the monitoring module 610 and the reporting module 620 may be pure hardware modules. The pure hardware modules include, but are not limited to, application specific integrated circuits.

In some examples, the reporting module 620 is configured to monitor the transmission delay of neighboring cells of the first cell in response to the transmission delay of the first cell reaching a delay threshold; and in response that the neighboring cells of the first cell comprise at least one second cell whose transmission delay is less than the transmission delay of the first cell, reporting a preset message carrying the cell identifier of the second cell, wherein the preset message is used to trigger the network side to issue a cell handover command based on the cell identifier of the second cell.

In some examples, the reporting module 620 is configured to: send an A3 event message carrying the cell identifier of the second cell; or send a cell handover request message carrying the cell identifier of the second cell.

In some examples, the second cell is a cell having a transmission delay less than the transmission delay of the first cell and having the smallest transmission delay among the neighboring cells of the first cell.

In some examples, the reporting module 620 is configured to report the preset message carrying congestion information in response to the transmission delay reaching the delay threshold, wherein the congestion information is used for the network side to determine whether to instruct the UE to perform cell handover.

In some examples, the device further includes: a first receiving module, configured to receive a cell handover command issued based on the preset message; and a handover module, configured to perform cell handover of the UE in accordance with the cell handover command.

In some examples, the device further includes: a determining module, configured to determine the current service of the UE. The reporting module 620 is configured to report the preset message in response to the transmission delay reaching the delay threshold and the current service of the UE being a preset service.

In some examples, the current service being a preset service includes at least one of the following: the application of the current service being in a preset application list; and the current service being a service that is determined according to historical records to have the UE ever triggered to perform cell handover when the transmission delay reaches the delay threshold.

In some examples, the device further includes: a saving module, configured to save the on-site information of the current service run by the UE when reporting the preset message, wherein the saved on-site information is used to continue running the current service after the UE performs cell handover.

Figure 7:
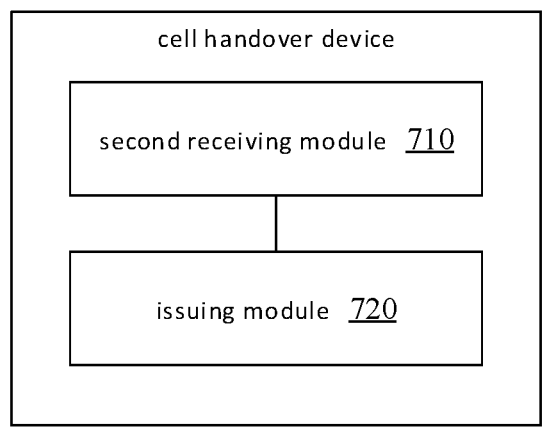
FIG. 7 is a schematic structural diagram of a cell handover device according to one or more examples of the present disclosure.

As shown in FIG. 7, an example of the present disclosure provides a UE cell handover device, which is applied to a base station of a first cell. The device includes: a second receiving module 710, configured to receive a preset message sent by the UE when it detects that the transmission delay of the first cell reaches a delay threshold; and an issuing module 720, configured to issue a cell handover command instructing the UE to perform cell handover according to the preset message.

In some examples, the second receiving module 710 and the issuing module 720 are both program modules. After being executed by a processor, the program modules can receive the preset message and issue the cell handover command.

In other examples, the second receiving module 710 and the issuing module 720 may be modules combining both hardware and software. The modules combining both hardware and software may include various programmable arrays. The programmable arrays include, but are not limited to, complex programmable arrays and/or field programmable arrays.

In some other examples, the second receiving module 710 and the issuing module 720 may be pure hardware modules. The pure hardware modules include, but are not limited to, application specific integrated circuits.

In some examples, the preset message is: A3 event message carrying the cell identifier of a second cell; or a cell handover request message carrying the cell identifier of a second cell, wherein the second cell is a neighboring cell of the first cell.

In some examples, the issuing module is configured to issue a cell handover command instructing the UE to switch to the second cell according to the preset message.

In some examples, the preset message is the preset message carrying congestion information.

The issuing module 720 is configured to: determine whether to issue a cell handover command instructing the UE to perform cell handover according to the congestion information and network load information; and issue the cell handover command to the UE if it is determined to issue the cell handover command instructing the UE to perform cell handover.

In some examples, the network load information includes at least one of the following: load status information of the current serving cell of the UE; and load status information of a neighboring cell of the serving cell.

In some examples, the issuing module 720 is configured to perform at least one of the following: determining, according to the congestion information and the load status information of the first cell, to issue a cell handover command instructing the UE to perform cell handover when it is determined that the load rate of the serving cell reaches a first threshold; determining, according to the congestion information and the load status information of the neighboring cell, to issue a cell handover command instructing the UE to perform cell handover when it is determined that the load rate of the neighboring cell is lower than a second threshold; and determining, according to the congestion information, the load status information of the first cell, and the load status information of the neighboring cell, to issue a cell handover command instructing the UE to perform cell handover when it is determined that the load balance condition for transferring loads to the neighboring cell is satisfied.

In some examples, the issuing module 720 is configured to issue a message confirmation instruction to the UE after receiving the preset message.

An example of the present disclosure provides a communication device, including: a memory for storing processor executable instructions; and a processor, connected with memory, wherein the processor is configured to execute the cell handover method provided by any of the foregoing technical solutions.

The processor may include various types of storage media. The storage media is a non-transitory computer storage medium that can continue to memorize and store information thereon after the communication device is powered off.

Here, the communication device includes a base station or a user equipment.

The processor may be connected to the memory via a bus or the like, and is used to read an executable program stored on the memory. For example, it can execute at least one of the methods shown in any of FIGS. 1 to 5.

Figure 8:
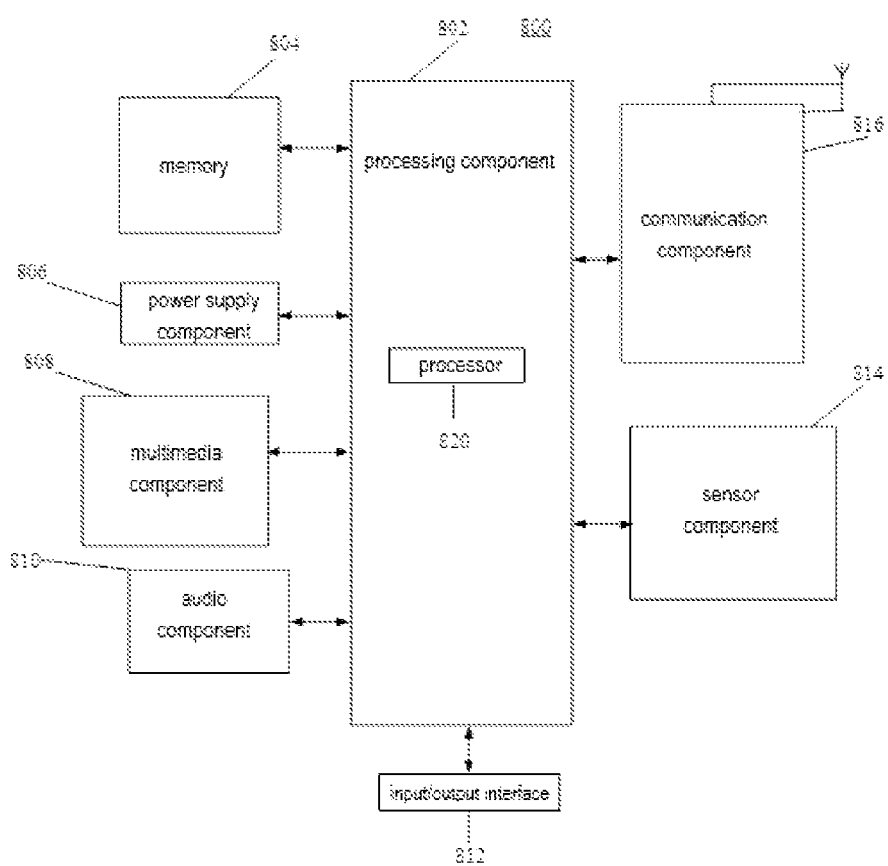
FIG. 8 is a schematic structural diagram of a UE according to one or more examples of the present disclosure.

FIG. 8 is a block diagram showing a UE 800 according to an example. For example, the UE 800 may be included in a terminal device such as a mobile phone, a mobile computer, or a server, etc. In short, the data processing UE 800 may be included in any type of communication device.

Reference is made to FIG. 7, wherein the UE 800 may include one or more of the following components: processing component 802, memory 804, power supply component 806, multimedia component 808, audio component 810, input/output (I/O) interface 812, sensor component 814, and communication component 816.

The processing component 802 generally controls the overall operations of the UE 800, such as operations associated with display, phone calls, data communication, camera operations, and recording operations. The processing component 802 may include one or more processors 820 to execute instructions to complete all or part of the steps of the foregoing method. In addition, the processing component 802 may include one or more modules to facilitate the interaction between the processing component 802 and other components. For example, the processing component 802 may include a multimedia module to facilitate the interaction between the multimedia component 808 and the processing component 802.

The memory 804 is configured to store various types of data to support the operation of the device 800. Examples of these data include instructions for any application or method operating on the UE 800, contact data, phone book data, messages, pictures, videos, etc. The memory 804 can be implemented by any type of volatile or non-volatile storage device or their combination, such as static random access memory (SRAM), electrically erasable programmable read-only memory (EEPROM), erasable and programmable read-only memory (EPROM), programmable read-only memory (PROM), read-only memory (ROM), magnetic memory, flash memory, magnetic disk or optical disk.

The power supply component 806 provides power for various components of the UE 800. The power component 806 may include a power management system, one or more power supplies, and other components associated with the generation, management, and distribution of power for the UE 800.

The multimedia component 808 includes a screen that provides an output interface between the UE 800 and the user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touch, sliding, and gestures on the touch panel. The touch sensor can not only sense the boundary of the touch or slide operation, but also detect the time duration and pressure related to the touch or slide operation. In some examples, the multimedia component 808 includes a front camera and/or a rear camera. When the device 800 is in an operating state, such as a shooting state or a video state, the front camera and/or the rear camera can receive external multimedia data. Each front camera and rear camera can be a fixed optical lens system or have the optical zooming capability.

The audio component 810 is configured to output and/or input audio signals. For example, the audio component 810 includes a microphone (MIC). When the UE 800 is in an operating state, such as a call state, a recording state, and a voice recognition state, the microphone is configured to receive external audio signals. The received audio signal may be further stored in the memory 804 or transmitted via the communication component 816. In some examples, the audio component 810 further includes a speaker for outputting audio signals.

The I/O interface 812 provides an interface between the processing component 802 and a peripheral interface module. The above-mentioned peripheral interface module may be a keyboard, a click wheel, a button, and the like. These buttons may include, but are not limited to, home button, volume button, start button, and lock button.

The sensor component 814 includes one or more sensors for providing UE 800 with various aspects of status assessment. For example, the sensor component 814 can detect the on/off status of the device 800 and the relative positioning among various components, such as display and keypad of the UE 800. The sensor component 814 can also detect the position change of the UE 800 or a component of the UE 800, the presence or absence of contact with the UE 800, the orientation or acceleration/deceleration of the UE 800, and the temperature change of the UE 800. The sensor component 814 may include a proximity sensor configured to detect the presence of nearby objects when there is no physical contact. The sensor component 814 may also include an optical sensor, such as a CMOS or CCD image sensor, for use in imaging applications. In some examples, the sensor component 814 may also include an acceleration sensor, a gyroscope sensor, a magnetic sensor, a pressure sensor, or a temperature sensor.

The communication component 816 is configured to facilitate wired or wireless communication between the UE 800 and other devices. The UE 800 can access a wireless network based on a communication standard, such as Wi-Fi, 2G, 3G, or a combination thereof. In an example, the communication component 816 receives a broadcast signal or broadcast related information from an external broadcast management system via a broadcast channel. In an example, the communication component 816 also includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an example, the device 800 may be implemented by one or more application specific integrated circuits (ASIC), digital signal processors (DSP), digital signal processing devices (DSPD), programmable logic devices (PLD), field programmable gate array (FPGA), controller, microcontroller, microprocessor, or other electronic components, configured to perform the above-mentioned methods.

In an example, there is also provided a non-transitory computer-readable storage medium including instructions, such as the memory 804 including instructions. The instructions can be executed by the processor 820 of the device 800 to complete the foregoing method. For example, the non-transitory computer-readable storage medium may be ROM, random access memory (RAM), CD-ROM, magnetic tape, floppy disk, optical data storage device, etc.

Figure 9:
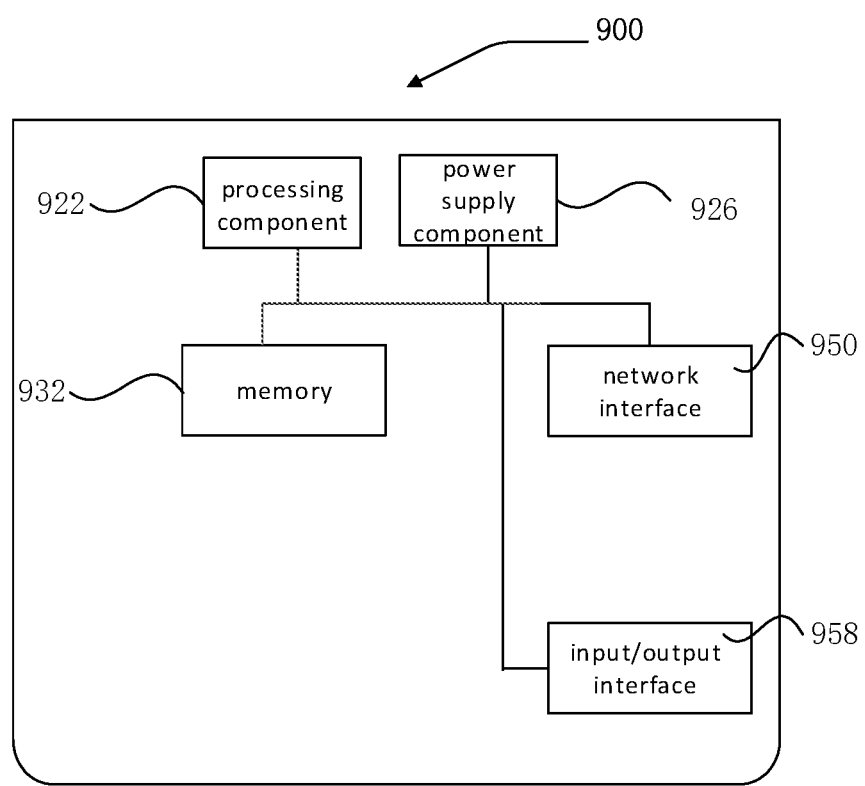
FIG. 9 is a schematic structural diagram of a base station according to one or more examples of the present disclosure.

Reference is made to FIG. 9, where the base station 900 includes: a processing component 922, which further includes one or more processors; and a memory resource represented by a memory 932, for storing instructions that can be executed by the processing component 922, such as application programs. The application programs stored in the memory 932 may include one or more module each corresponding to a set of instructions. In addition, the processing component 922 is configured to execute instructions to execute any of the aforementioned methods applied to the access device, for example, the method as shown in FIG. 2, FIG. 3 to FIG. 5, FIG. 6A to FIG. 6D, FIG. 7A to FIG. 7B, and/or FIGS. 8A to 8C.

The base station 900 may also include: a power supply component 926, configured to perform power management of the base station 900; a wired or wireless network interface 950, configured to connect the base station 900 to the network; and an input/output (I/O) interface 958. The base station 900 can operate based on an operating system stored in the memory 932, such as Windows Server™, Mac OS X™, Unix™, Linux™, FreeBSD™ or the like.

Examples of the present disclosure provide a non-transitory computer-readable storage medium. When the instructions in the storage medium are executed by the processor of the UE, the UE or the base station can execute the cell handover method provided by any of the foregoing examples, and can execute at least one of the methods shown in FIG. 1 and/or FIG. 3.

The cell handover method may be a cell handover method performed by the UE. The method includes: monitoring the transmission delay of the first cell where the UE is currently located; and reporting a preset message in response to the transmission delay reaching a delay threshold, wherein the preset message is configured to trigger the base station to issue a cell handover command instructing the UE to perform cell handover.

In an example, the reporting the preset message in response to the transmission delay reaching the delay threshold includes: monitoring the transmission delays of neighboring cells of the first cell in response to the transmission delay of the first cell reaching the delay threshold; and in response that the neighboring cells of the first cell comprise at least one second cell whose transmission delay is less than the transmission delay of the first cell, reporting the preset message carrying the cell identifier of the second cell, wherein the preset message is configured to trigger the network side to issue the cell handover command based on the cell identifier of the second cell.

In an example, the reporting the preset message carrying the cell identifier of the second cell includes: sending an A3 event message carrying the cell identifier of the second cell; or sending a cell handover request message carrying the cell identifier of the second cell.

In an example, the second cell is a cell having a transmission delay less than the transmission delay of the first cell and having the smallest transmission delay among the neighboring cells of the first cell.

In an example, the reporting the preset message in response to the transmission delay reaching the delay threshold includes: reporting the preset message carrying congestion information in response to the transmission delay reaching the delay threshold, wherein the congestion information is configured for the network side to determine whether to instruct the UE to perform cell handover.

In an example, the method further includes: receiving a cell handover command issued based on the preset message; and performing cell handover of the UE according to the cell handover command.

In an example, the method further includes: determine the current service of the UE. The reporting the preset message in response to the transmission delay reaching the delay threshold includes: in response that the transmission delay reaches the delay threshold and the current service of the UE is a preset service, reporting the preset message.

In an example, the current service being a preset service includes at least one of the following: the application of the current service being in a preset application list; and the current service being a service that is determined according to historical records to have the UE ever triggered to perform cell handover when the transmission delay reaches the delay threshold.

In an example, the method further includes: saving the on-site information of the current service run by the UE when reporting the preset message, wherein the saved on-site information is configured to continue running the current service after the UE performs cell handover.

The cell handover method performed by the base station of the first cell may include: receiving a preset message sent by the UE when it monitors that the transmission delay of the first cell reaches a delay threshold; and issuing a cell handover command instructing the UE to perform cell handover according to the preset message.

In an example, the preset message is: an A3 event message carrying the cell identifier of a second cell; or a cell handover request message carrying the cell identifier of a second cell, wherein the second cell is a neighboring cell of the first cell.

In an example, the issuing the cell handover command instructing the UE to perform cell handover according to the preset message includes: issuing the cell handover command instructing the UE to switch to the second cell according to the preset message.

In an example, the preset message is the preset message carrying congestion information. The issuing the cell handover command instructing the UE to perform cell handover according to the preset message includes: determining whether to issue the cell handover command instructing the UE to perform cell handover according to the congestion information and network load information; and issuing the cell handover command to the UE if it is determined to issue the cell handover command instructing the UE to perform cell handover.

In an example, the network load information includes at least one of the following: load status information of the currently serving cell of the UE; and load status information of a neighboring cell of the serving cell.

In an example, the determining whether to issue the cell handover command instructing the UE to perform cell handover according to the congestion information and the network load information includes at least one of the following: determining, according to the congestion information and the load status information of the first cell, to issue the cell handover command instructing the UE to perform cell handover when it is determined that the load rate of the serving cell reaches a first threshold; determining, according to the congestion information and the load status information of the neighboring cell, to issue the cell handover command instructing the UE to perform cell handover when it is determined that the load rate of the neighboring cell is lower than a second threshold; and determining, according to the congestion information, the load status information of the first cell, and the load status information of the neighboring cell, to issue the cell handover command instructing the UE to perform cell handover when it is determined that the load balance condition for transferring loads to the neighboring cell is satisfied.

In an example, the method further includes: sending a message confirmation instruction to the UE after receiving the preset message.

A first aspect of the present disclosure provides a cell handover method, which is applied to a user equipment UE. The method includes: monitoring a transmission delay of a first cell where the UE is currently located; and reporting a preset message in response to the transmission delay reaching a delay threshold, wherein the preset message is configured to trigger a base station to issue a cell handover command instructing the UE to perform cell handover.

In an example, the reporting the preset message in response to the transmission delay reaching the delay threshold includes: monitoring transmission delays of neighboring cells of the first cell in response to the transmission delay of the first cell reaching the delay threshold; and in response that the neighboring cells of the first cell comprise at least one second cell whose transmission delay is less than the transmission delay of the first cell, reporting the preset message carrying a cell identifier of the second cell, wherein the preset message is configured to trigger a network side to issue the cell handover command based on the cell identifier of the second cell.

In an example, the reporting the preset message carrying the cell identifier of the second cell includes: sending an A3 event message carrying the cell identifier of the second cell; or sending a cell handover request message carrying the cell identifier of the second cell.

In an example, the second cell is a cell having a transmission delay less than the transmission delay of the first cell and having the smallest transmission delay among the neighboring cells of the first cell.

In an example, the reporting the preset message in response to the transmission delay reaching the delay threshold includes: reporting the preset message carrying congestion information in response to the transmission delay reaching the delay threshold, wherein the congestion information is configured for a network side to determine whether to instruct the UE to perform cell handover.

In an example, the method further includes: receiving the cell handover command issued based on the preset message; and performing cell handover of the UE according to the cell handover command.

In an example, the method further includes: determining a current service of the UE. The reporting the preset message in response to the transmission delay reaching the delay threshold includes: in response that the transmission delay reaches the delay threshold and the current service of the UE is a preset service, reporting the preset message.

In an example, the current service being the preset service includes at least one of: an application of the current service being in a preset application list; and the current service being a service that is determined according to historical records to have the UE triggered to perform cell handover when the transmission delay reaches the delay threshold.

In an example, the method further includes: saving on-site information of the current service run by the UE while reporting the preset message, wherein the saved on-site information is configured to continue running the current service after the UE performs cell handover.

A second aspect of the present disclosure provides a UE cell handover method, which is applied to a base station of a first cell. The method includes: receiving a preset message sent by the UE when a transmission delay of the first cell is monitored to reach a delay threshold; and issuing a cell handover command instructing the UE to perform cell handover according to the preset message.

In an example, the preset message is: an A3 event message carrying a cell identifier of a second cell; or a cell handover request message carrying a cell identifier of a second cell, wherein the second cell is a neighboring cell of the first cell.

In an example, the issuing the cell handover command instructing the UE to perform cell handover according to the preset message includes: issuing the cell handover command instructing the UE to switch to the second cell according to the preset message.

In an example, the preset message carries congestion information. The issuing the cell handover command instructing the UE to perform cell handover according to the preset message includes: determining whether to issue the cell handover command instructing the UE to perform cell handover according to the congestion information and network load information; and issuing the cell handover command to the UE if it is determined to issue the cell handover command instructing the UE to perform cell handover.

In an example, the network load information includes at least one of: load status information of the currently serving cell of the UE; and load status information of a neighboring cell of the serving cell.

In an example, the determining whether to issue the cell handover command instructing the UE to perform cell handover according to the congestion information and the network load information includes at least one of: determining, according to the congestion information and load status information of the first cell, to issue the cell handover command instructing the UE to perform cell handover when a load rate of the serving cell reaches a first threshold; determining, according to the congestion information and load status information of the neighboring cell, to issue the cell handover command instructing the UE to perform cell handover when a load rate of the neighboring cell is lower than a second threshold; and determining, according to the congestion information, the load status information of the first cell, and the load status information of the neighboring cell, to issue the cell handover command instructing the UE to perform cell handover when a load balance condition for transferring loads to the neighboring cell is satisfied.

In an example, the method further includes: sending a message confirmation instruction to the UE after receiving the preset message.

A third aspect of the present disclosure provides a cell handover device, which is applied to a user equipment UE. The device includes: a monitoring module, configured to monitor a transmission delay of a first cell where the UE is currently located; and a reporting module, configured to report a preset message in response to the transmission delay reaching a delay threshold, wherein the preset message is configured to trigger a base station to issue a cell handover command instructing the UE to perform cell handover.

In a example, the reporting module is configured to: monitor transmission delays of neighboring cells of the first cell in response to the transmission delay of the first cell reaching the delay threshold; and in response that the neighboring cells of the first cell comprise at least one second cell whose transmission delay is less than the transmission delay of the first cell, report the preset message carrying a cell identifier of the second cell, wherein the preset message is configured to trigger a network side to issue the cell handover command based on the cell identifier of the second cell.

In an example, the reporting module is configured to: send an A3 event message carrying the cell identifier of the second cell; or send a cell handover request message carrying the cell identifier of the second cell.

In an example, the second cell is a cell having a transmission delay less than the transmission delay of the first cell and having the smallest transmission delay among the neighboring cells of the first cell.

In an example, the reporting module is configured to report the preset message carrying congestion information in response to the transmission delay reaching the delay threshold, wherein the congestion information is configured for a network side to determine whether to instruct the UE to perform cell handover.

In an example, the device further includes: a first receiving module, configured to receive the cell handover command issued based on the preset message; and a handover module, configured to perform cell handover of the UE in accordance with the cell handover command.

In an example, the device further includes: a determining module, configured to determine the current service of the UE. The reporting module is configured to report the preset message in response to the transmission delay reaching a delay threshold and the current service of the UE being a preset service.

In an example, the current service being the preset service includes at least one of: an application of the current service being in a preset application list; and the current service being a service that is determined according to historical records to have the UE triggered to perform cell handover when the transmission delay reaches the delay threshold.

In an example, the device further includes: a saving module, configured to save on-site information of the current service run by the UE while reporting the preset message, wherein the saved on-site information is configured to continue running the current service after the UE performs cell handover.

A fourth aspect of the present disclosure provides a UE cell handover device, which is applied to a base station of a first cell. The device includes: a second receiving module, configured to receive a preset message sent by the UE when the transmission delay of the first cell is monitored to reach a delay threshold; and an issuing module, configured to issue a cell handover command instructing the UE to perform cell handover according to the preset message.

In an example, the preset message is: an A3 event message carrying a cell identifier of a second cell; or a cell handover request message carrying a cell identifier of a second cell, wherein the second cell is a neighboring cell of the first cell.

In an example, the issuing module is configured to issue the cell handover command instructing the UE to switch to the second cell according to the preset message.

In an example, the preset message carries congestion information. The issuing module is configured to: determine whether to issue the cell handover command instructing the UE to perform cell handover according to the congestion information and network load information; and issue the cell handover command to the UE if it is determined to issue the cell handover command instructing the UE to perform cell handover.

In an example, the network load information includes at least one of: load status information of the currently serving cell of the UE; and load status information of a neighboring cell of the serving cell.

In an example, the issuing module is configured to perform at least one of: determining, according to the congestion information and load status information of the first cell, to issue the cell handover command instructing the UE to perform cell handover when a load rate of the serving cell reaches a first threshold; determining, according to the congestion information and load status information of the neighboring cell, to issue the cell handover command instructing the UE to perform cell handover when a load rate of the neighboring cell is lower than a second threshold; and determining, according to the congestion information, the load status information of the first cell, and the load status information of the neighboring cell, to issue the cell handover command instructing the UE to perform cell handover when a load balance condition for transferring loads to the neighboring cell is satisfied.

In an example, the issuing module is configured to issue a message confirmation instruction to the UE after receiving the preset message.

According to a fifth aspect of the present disclosure, a communication device is provided, including: a memory for storing processor executable instructions; and a processor connected to the memory, wherein the processor is configured to execute the cell handover method as described above.

According to a sixth aspect of the present disclosure, there is provided a non-transitory computer-readable storage medium. When instructions in the storage medium are executed by a processor of a computer, the computer can execute the cell handover method as described above.

Those skilled in the art will easily think of other examples of the present disclosure after considering the present specification and practicing the present disclosure herein. The present disclosure is intended to cover any variations, uses, or adaptive changes of the present disclosure. These variations, uses, or adaptive changes follow the general principle of the present disclosure, and include common knowledge or conventional technical means in the technical field that are not disclosed in the present disclosure. The description and examples are to be regarded as exemplary only, and the true scope and spirit of the present disclosure are defined by the following claims.

It should be understood that the present disclosure is not limited to the precise structure that has been described above and shown in the drawings, and various modifications and changes can be made without departing from the scope of the present disclosure. The scope of the present disclosure is only limited by the appended claims.

The invention claimed is:

1. A cell handover method, comprising:
    monitoring, by a user equipment (UE), a transmission delay of a first cell where the UE is currently located;
    determining a current service of the UE, and
    reporting, by the UE, a preset message in response to the transmission delay reaching a delay threshold and the current service of the UE being a preset service, wherein the preset message is configured to trigger a base station to issue a cell handover command instructing the UE to perform cell handover.

2. The method according to claim 1, wherein reporting the preset message in response to the transmission delay reaching the delay threshold and the current service of the UE being a preset service comprises:
    monitoring transmission delays of neighboring cells of the first cell in response to the transmission delay of the first cell reaching the delay threshold; and
    in response to determining that the neighboring cells of the first cell comprises at least one second cell whose transmission delay is less than the transmission delay of the first cell, reporting the preset message carrying a cell identifier of a second cell, wherein the preset message is configured to trigger a network side to issue the cell handover command based on the cell identifier of the second cell.

3. The method according to claim 2, wherein the reporting the preset message carrying the cell identifier of the second cell comprises:
    sending an A3 event message carrying the cell identifier of the second cell; or
    sending a cell handover request message carrying the cell identifier of the second cell.

4. The method according to claim 2, wherein the second cell is a cell having a transmission delay less than the transmission delay of the first cell and having the smallest transmission delay among the neighboring cells of the first cell.

5. The method according to claim 1, wherein reporting the preset message in response to the transmission delay reaching the delay threshold and the current service of the UE being a preset service comprises:
    reporting the preset message carrying congestion information in response to the transmission delay reaching the delay threshold, wherein the congestion information is configured for a network side to determine whether to instruct the UE to perform cell handover.

6. The method according to claim 1, further comprising:
    receiving the cell handover command issued based on the preset message; and
    performing cell handover of the UE according to the cell handover command.

7. The method according to claim 1, wherein the current service of the UE being the preset service comprises at least one of:
    an application of the current service being in a preset application list; or
    the current service being a service that, according to historical records, triggers the UE to perform cell handover when the transmission delay reaches the delay threshold.

8. The method according to claim 1, further comprising:
saving on-site information of the current service run by the UE while reporting the preset message, wherein the saved on-site information is configured to allow the current service to continue running after the UE performs cell handover.

9. A UE cell handover method, comprising:
receiving, by a base station in a first cell, a preset message sent by a user equipment (UE) when a transmission delay of the first cell is monitored to reach a delay threshold; and
issuing, by the base station, a cell handover command instructing the UE to perform cell handover according to the preset message,
wherein the preset message comprises congestion information; and
wherein issuing the cell handover command instructing the UE to perform cell handover according to the preset message comprises:
 determining, based on the congestion information and network load information, whether to issue the cell handover command instructing the UE to perform cell handover; and
 upon determining to issue the cell handover command, issuing the cell handover command to the UE to perform the cell handover.

10. The method according to claim 9, wherein the preset message comprises:
an A3 event message carrying a cell identifier of a second cell; or
a cell handover request message carrying a cell identifier of a second cell,
wherein the second cell is a neighboring cell of the first cell.

11. The method according to claim 10, wherein issuing the cell handover command instructing the UE to perform cell handover according to the preset message comprises:
issuing the cell handover command instructing the UE to switch to the second cell according to the preset message.

12. The method according to claim 9, wherein the network load information comprises at least one of:
load status information of a currently serving cell of the UE; or
load status information of a neighboring cell of the serving cell.

13. The method according to claim 12, wherein determining whether to issue the cell handover command instructing the UE to perform cell handover comprises at least one of:
determining, according to the congestion information and load status information of the first cell, to issue the cell handover command instructing the UE to perform cell handover when a load rate of the serving cell reaches a first threshold;
determining, according to the congestion information and load status information of the neighboring cell, to issue the cell handover command instructing the UE to perform cell handover when a load rate of the neighboring cell is lower than a second threshold; or
determining, according to the congestion information, the load status information of the first cell, and the load status information of the neighboring cell, to issue the cell handover command instructing the UE to perform cell handover when a load balance condition for transferring loads to the neighboring cell is satisfied.

14. The method according to claim 9, further comprising:
sending a message confirmation instruction to the UE after receiving the preset message.

15. A communication device, comprising:
a memory, configured to store processor executable instructions; and
a processor, connected to the memory, wherein the processor is configured to execute a cell handover method, and wherein the cell handover method is applied to a user equipment UE and comprises:
 monitoring a transmission delay of a first cell where the UE is currently located;
 determining a current service of the UE, and
 reporting a preset message in response to the transmission delay reaching a delay threshold and the current service of the UE being a preset service, wherein the preset message is configured to trigger a base station to issue a cell handover command instructing the UE to perform cell handover.

16. The communication device according to claim 15, wherein reporting the preset message in response to the transmission delay reaching the delay threshold and the current service of the UE being a preset service comprises:
monitoring transmission delays of neighboring cells of the first cell in response to the transmission delay of the first cell reaching the delay threshold; and
in response to determining that the neighboring cells of the first cell comprises at least one second cell whose transmission delay is less than the transmission delay of the first cell, reporting the preset message carrying a cell identifier of the second cell, wherein the preset message is configured to trigger a network side to issue the cell handover command based on the cell identifier of the second cell.

17. The communication device according to claim 16, wherein reporting the preset message carrying the cell identifier of the second cell comprises:
sending an A3 event message carrying the cell identifier of the second cell; or
sending a cell handover request message carrying the cell identifier of the second cell.

18. The communication device according to claim 15, wherein reporting the preset message in response to the transmission delay reaching the delay threshold comprises:
reporting the preset message carrying congestion information in response to the transmission delay reaching the delay threshold, wherein the congestion information is configured for a network side to determine whether to instruct the UE to perform cell handover.

* * * * *